United States Patent
Osa et al.

(10) Patent No.: US 12,240,362 B2
(45) Date of Patent: Mar. 4, 2025

(54) SEAT CUSHION FRAME, VEHICLE SEAT FRAME, AND VEHICLE SEAT

(71) Applicants: NHK SPRING CO., LTD., Yokohama (JP); SUBARU CORPORATION, Tokyo (JP)

(72) Inventors: Syunichirou Osa, Yokohama (JP); Hiroki Matsuda, Yokohama (JP); Jun Shirai, Yokohama (JP); Masafumi Takano, Tokyo (JP); Fumito Kitanaka, Tokyo (JP); Kenji Nagumo, Tokyo (JP); Suguru Ishikawa, Tokyo (JP)

(73) Assignees: NHK Spring Co., Ltd., Yokohama (JP); Subaru Corporation, Tokyo (JP)

( * ) Notice: Subject to any disclaimer, the term of this patent is extended or adjusted under 35 U.S.C. 154(b) by 48 days.

(21) Appl. No.: 18/145,715

(22) Filed: Dec. 22, 2022

(65) Prior Publication Data

US 2023/0202362 A1 Jun. 29, 2023

(30) Foreign Application Priority Data

Dec. 27, 2021 (JP) .................. 2021-213145

(51) Int. Cl.
*B60N 2/68* (2006.01)
*B60N 2/427* (2006.01)
*B60N 2/50* (2006.01)

(52) U.S. Cl.
CPC ........... *B60N 2/68* (2013.01); *B60N 2/42718* (2013.01); *B60N 2/506* (2013.01)

(58) Field of Classification Search
CPC ....... B60N 2/68; B60N 2/506; B60N 2/42718
USPC ...................................... 297/216.1
See application file for complete search history.

(56) References Cited

U.S. PATENT DOCUMENTS

| | | | |
|---|---|---|---|
| 6,619,750 B2 * | 9/2003 | Toyota ..................... | B60N 2/68 248/429 |
| 2013/0193725 A1 * | 8/2013 | Morimoto .................. | 297/216.1 |
| 2013/0278030 A1 | 10/2013 | Munemura et al. | |

FOREIGN PATENT DOCUMENTS

| | | | |
|---|---|---|---|
| CN | 108466574 A | * | 8/2018 |
| JP | 2003-104107 A | | 4/2003 |
| JP | 5921307 B2 | | 5/2016 |
| JP | 2019-127187 A | | 8/2019 |

* cited by examiner

*Primary Examiner* — Anthony D Barfield
(74) *Attorney, Agent, or Firm* — Knobbe, Martens, Olson & Bear, LLP

(57) ABSTRACT

A seat cushion frame configuring framework of a seat cushion for an occupant of a vehicle to sit on, and including left and right side frames, a cushion pan, and a reinforcement member. The left and right side frames are disposed at left and right side portions of the seat cushion. The cushion pan connects upper end portions of front portions of the left and right side frames together in a seat left-right direction. The reinforcement member includes the left and right reinforcement portions respective affixed to the seat left-right direction sides of the rear end portion of the cushion pan.

6 Claims, 9 Drawing Sheets

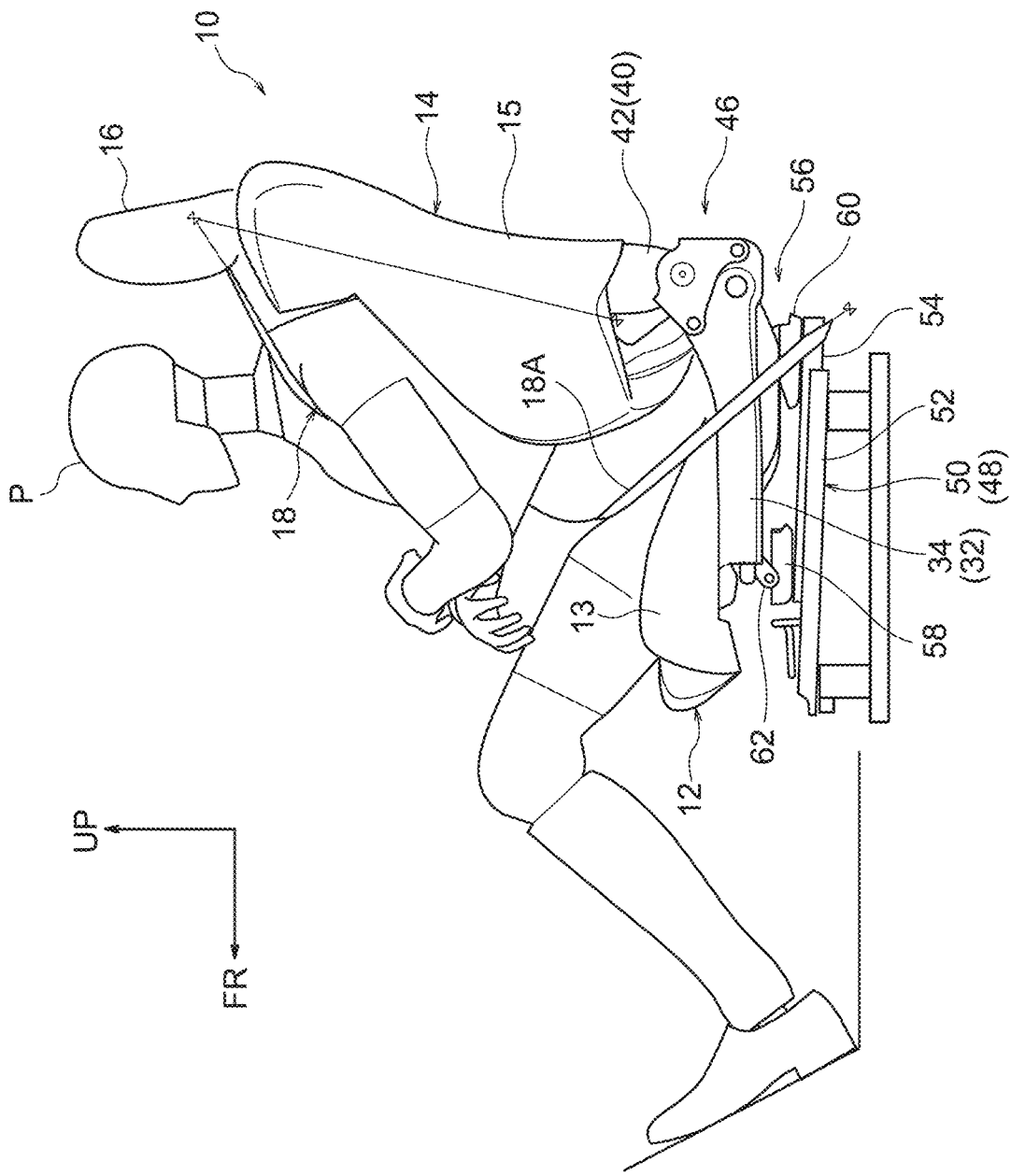

SEAT CUSHION FRAME, VEHICLE SEAT FRAME, AND VEHICLE SEAT

CROSS-REFERENCE TO RELATED APPLICATION

This application is based on and claims priority under 35 USC 119 from Japanese Patent Application No. 2021-213145 filed on Dec. 27, 2021, the disclosure of which is incorporated by reference herein.

BACKGROUND

Technical Field

The present disclosure relates to a vehicle seat and a frame thereof.

Related Art

A vehicle seat described in Japanese Patent Application Laid-Open (JP-A) No. 2019-127187 includes a left-right pair of side frames provided separated from each other in a seat width direction, a first pan frame connected to the left and right side frames, a second pan frame formed divided from the first pan frame, and a left-right pair of connection brackets that connect the first pan frame to the second pan frame. The left and right connection brackets include a first attachment portion to the first pan frame and a second attachment portion to the second pan frame, and the first attachment portion and the second attachment portion are disposed at different seat width direction positions from each other. In such a vehicle seat, the left and right connection brackets deform when an seated occupant sinks in diagonally forward and downward due to a submarining phenomenon occurring during a head-on collision, such that shock on the seated occupant is absorbed.

SUMMARY

In the above related art a pan frame (cushion pan) is configured by the first pan frame, the second pan frame, and the left and right connection brackets, and so the configuration of cushion pan is complicated.

In consideration of the above circumstances, an object of the present disclosure is to obtain a seat cushion frame, a vehicle seat frame, and a vehicle seat that are capable of securing shock absorbing ability using a simple configuration, while suppressing a submarining phenomenon from occurring during a head-on collision.

A seat cushion frame of a first aspect of the present disclosure is a seat cushion frame configuring framework of a seat cushion for an occupant of a vehicle to sit on. The seat cushion frame includes left and right side frames disposed at left and right side portions of the seat cushion, a cushion pan connecting upper end portions of front portions of the left and right side frames together in a seat left-right direction, and a reinforcement member that includes left and right reinforcement portions respectively affixed to seat left-right direction two sides of a rear end portion of the cushion pan so as to reinforce the sides to which the reinforcement portions are affixed.

In the first aspect, the seat cushion frame configuring the framework of the seat cushion for an occupant of a vehicle to sit on includes the left and right side frames, the cushion pan, and the reinforcement member. The left and right side frames are disposed at left and right side portions of the seat cushion. The cushion pan connects the upper end portions of the front portions of the left and right side frames together in the seat left-right direction. The reinforcement member includes the left and right reinforcement portions respective affixed to the seat left-right direction sides of the rear end portion of the cushion pan. The locations of the cushion pan affixed with the left and right reinforcement portions are reinforced, and so deformation of the cushion pan by load from the buttocks of an occupant imparted to the cushion pan at an initial stage of the head-on collision can be suppressed. The reaction force from the cushion pan imparted to the buttocks of the occupant at the initial stage of a head-on collision is increased thereby, enabling a submarining phenomenon to be suppressed from occurring. The load from the buttocks of the occupant imparted to the cushion pan increases at a later stage of a head-on collision, leading to the cushion pan deforming from the seat left-right direction center, which is not reinforced by the left and right reinforcement portions. This enables a shock absorbing ability to be secured. Moreover, an existing cushion pan can be appropriated as the above cushion pan, enabling a simple configuration to be achieved.

A seat cushion frame of a second aspect of the present disclosure is the first aspect, wherein the left and right reinforcement portions are disposed at positions opposing left and right ischial bones of the occupant from a seat front side.

In the second aspect, the left and right reinforcement portions fixed to the seat left-right direction two sides of the rear end portion of the cushion pan are disposed at positions opposing the left and right ischial bones of the occupant seated on the seat cushion from the seat front side. This means that the left and right ischial bones of the occupant bear reaction force from locations of the cushion pan affixed with the left and right reinforcement portions at an initial stage of a head-on collision. The forward movement of the occupant due to the shock of a head-on collision can accordingly be suppressed effectively thereby.

The seat cushion frame of a third aspect of the present disclosure is the first aspect, wherein the reinforcement member includes a connection portion that connects the left and right reinforcement portions together in the seat left-right direction.

In the third aspect, the left and right reinforcement portions of the reinforcement member are connected together in the seat left-right direction by the connection member, and so this enables the reinforcement member to be configured as a single component. As a result this facilitates a reduction in manufacturing cost compared to cases in which the reinforcement member is two components. Moreover, due to the occupant being imparted with reaction force from the connection portion at the initial stage of a head-on collision, the submarining phenomenon occurrence suppressing effect can be raised even more.

A seat cushion frame of a fourth aspect of the present disclosure is the first aspect, wherein the left and right side frames are connected to a floor section of the vehicle via left and right links having respective one end portions connected to the front portions of the left and right side frames, via left and right risers to which respective other end portions of the left and right links are connected, and via left and right slide rails to which the left and right risers are attached, and left and right reinforcement patches are affixed to seat left-right direction side surfaces of the front portions of the left and right side frames further toward a seat front side than the one end portions of the left and right links, such that the front portions of the left and right side frames are reinforced by the left and right reinforcement patches.

In the fourth aspect, the left and right side frames are connected to the floor section of the vehicle via the left and right links having the respective one end portions connected to the front portions thereof, via the left and right risers to which the respective other end portions of the left and right links are connected, and via the left and right slide rails to which the left and right risers are attached. The left and right reinforcement patches are fixed to the seat left-right direction side surfaces of the front portions of the left and right side frames further to a seat front side than the one end portions of the left and right links, such that the front portions of the left and right side frames are reinforced by these reinforcement patches. Thus the left and right side frames are suppressed from deforming so as to collapse inward toward the seat left-right direction insides when load from the occupant is imparted to the front portions of the left and right side frames through the cushion pan at an initial stage of a head-on collision. As a result thereof, the reaction force imparted to the occupant at the initial stage of a head-on collision increases, enabling the submarining phenomenon occurrence suppressing effect can be raised even more.

A vehicle seat frame of a fifth aspect of the present disclosure includes the seat cushion frame of the first aspect, left and right links each having a one end portion connected to respective front portion of the left and right side frames included in the seat cushion frame, left and right slide rails that are disposed below the left and right side frames and that are attached to a floor section of the vehicle, and left and right risers that are respectively attached to the left and right slide rails and to which respective other end portions of the left and right links are connected.

In the fifth aspect the seat cushion frame includes the left and right side frames. The respective one end portions of the left and right links are connected to the front portions of the left and right side frames. The left and right slide rails attached to the floor section of the vehicle are disposed below the left and right side frames. The left and right risers connected to the respective other end portions of the left and right links are attached to the left and right slide rails. The above seat cushion frame is the seat cushion frame of the first aspect. This means that similar advantageous effects to those of the first aspect are obtained.

A vehicle seat of a sixth aspect of the present disclosure includes a seat cushion for an occupant to sit on, a seatback configuring a backrest to support a back of the occupant, and a framework of the seat cushion comprising the seat cushion frame of the first aspect.

In the sixth aspect, the vehicle seat including the seat cushion and the seatback has framework of the seat cushion configured by the seat cushion frame of the first aspect. This means that similar advantageous effects to those of the first aspect are obtained.

As described above, the seat cushion frame, the vehicle seat frame, and the vehicle seat according to the present disclosure enables a shock absorbing ability to be secured with a simple configuration, while still suppressing occurrence of a submarining phenomenon during a head-on collision.

BRIEF DESCRIPTION OF THE DRAWINGS

Exemplary embodiments of the present disclosure will be described in detail based on the following figures, wherein:

FIG. 8B is a side view corresponding to FIG. 8A and illustrating a state at an initial stage in a head-on collision.

DETAILED DESCRIPTION

Figure 1:
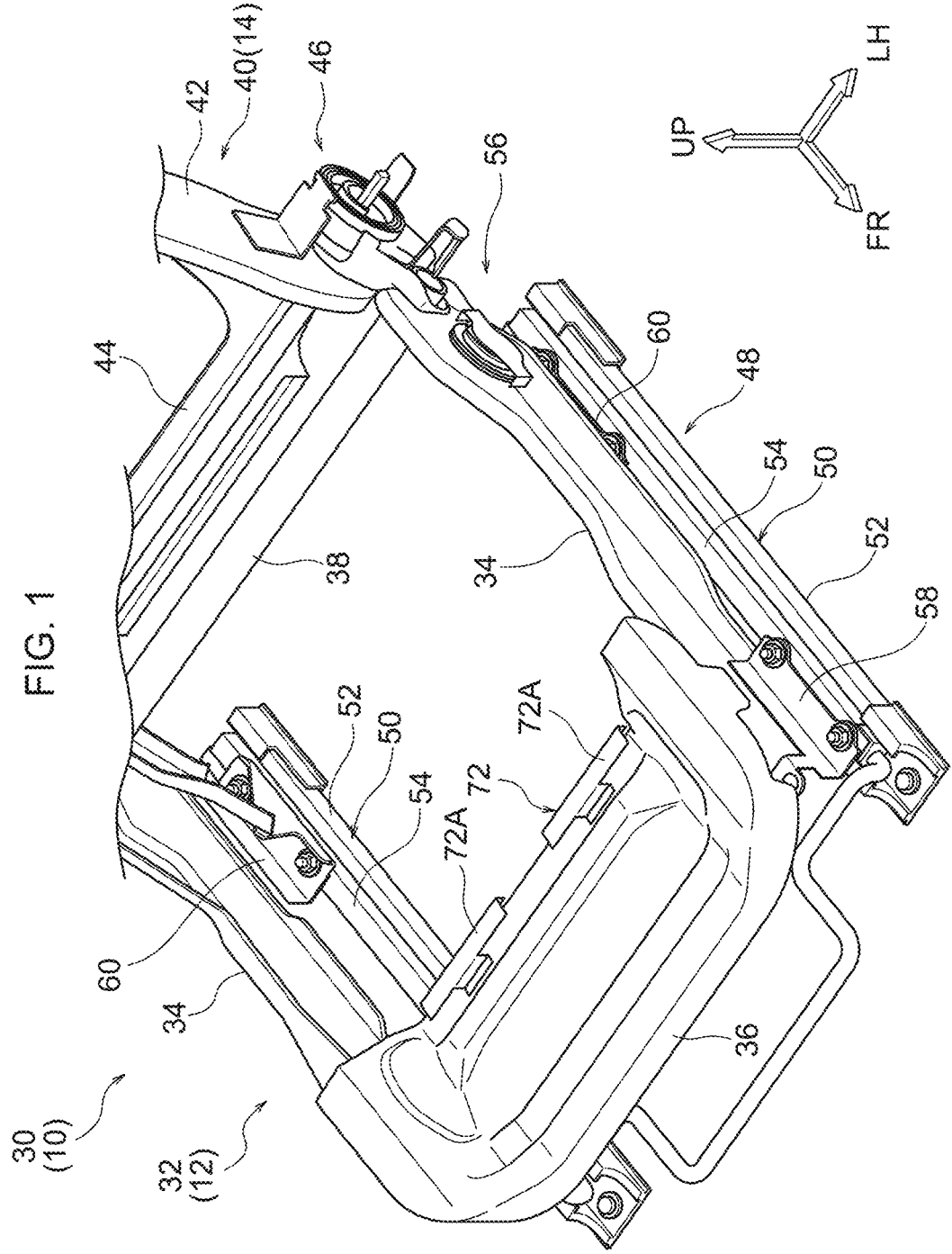
FIG. 1 is a perspective view illustrating a periphery of a seat cushion frame in a vehicle seat frame according to an exemplary embodiment, in a state viewed diagonal from a seat left-front side and above.

A vehicle seat 10, a vehicle seat frame 30, and a seat cushion frame 32 according to an exemplary embodiment of the present disclosure will now be described, with reference to FIG. 1 to FIG. 8C. Note that some of the reference numerals are omitted in the drawings to make viewing the drawings clearer. Moreover as appropriate in the drawings, an arrow FR indicates a vehicle front direction, an arrow UP indicates a vehicle upward direction, an arrow LH indicates a vehicle left direction, and an arrow RH indicates a vehicle right direction. When front-rear, left-right, and up-down directions are used in the following explanation, unless particularly stated otherwise, these refer to front-rear in the vehicle front-rear direction, left-right in the vehicle left-right direction (vehicle width direction), and up-down in the vehicle up-down direction.

Figure 8A:
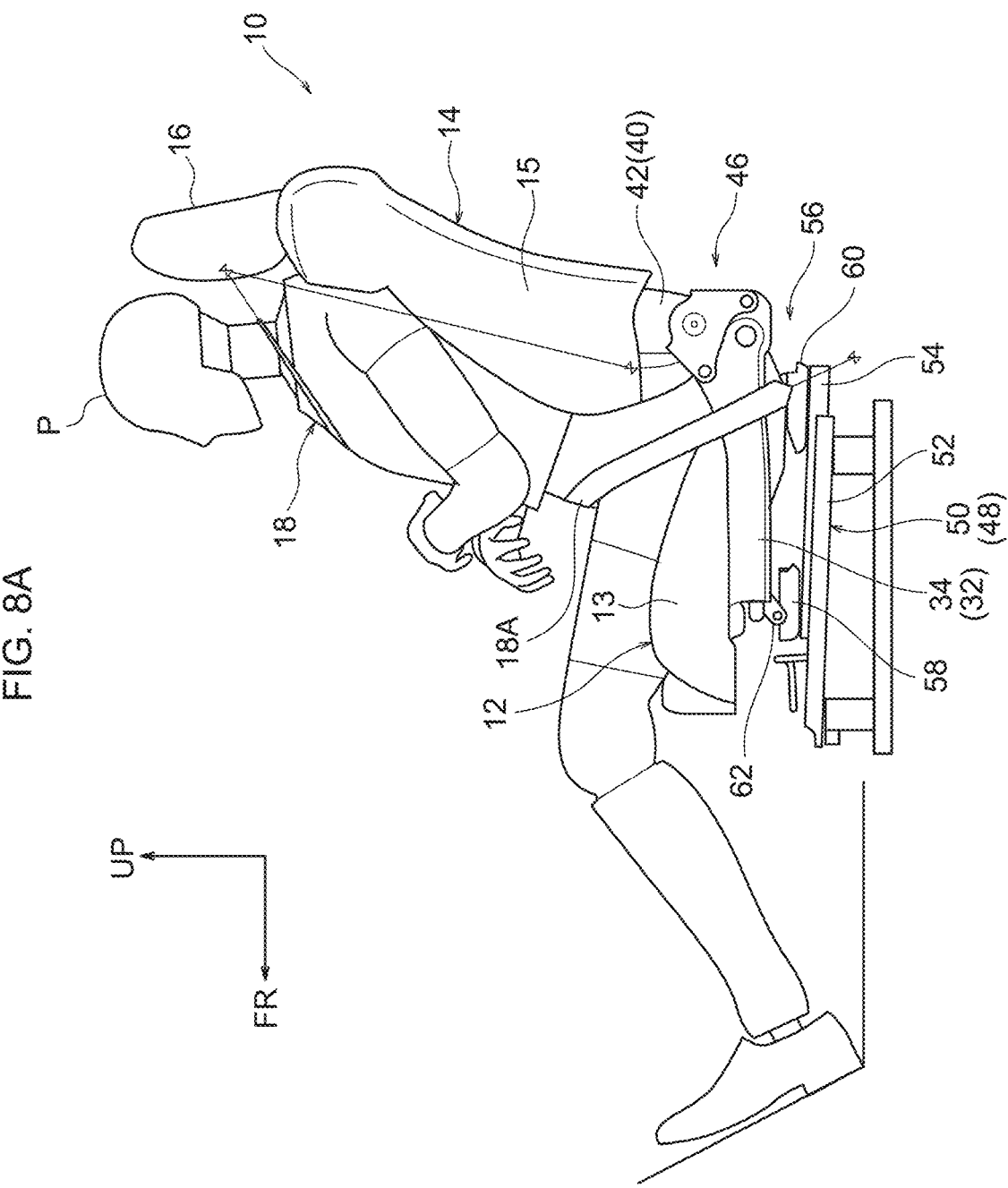
FIG. 8A is a side view illustrating a vehicle seat according to an exemplary embodiment, and is a side view illustrating a state prior to a head-on collision.
Figure 8C:
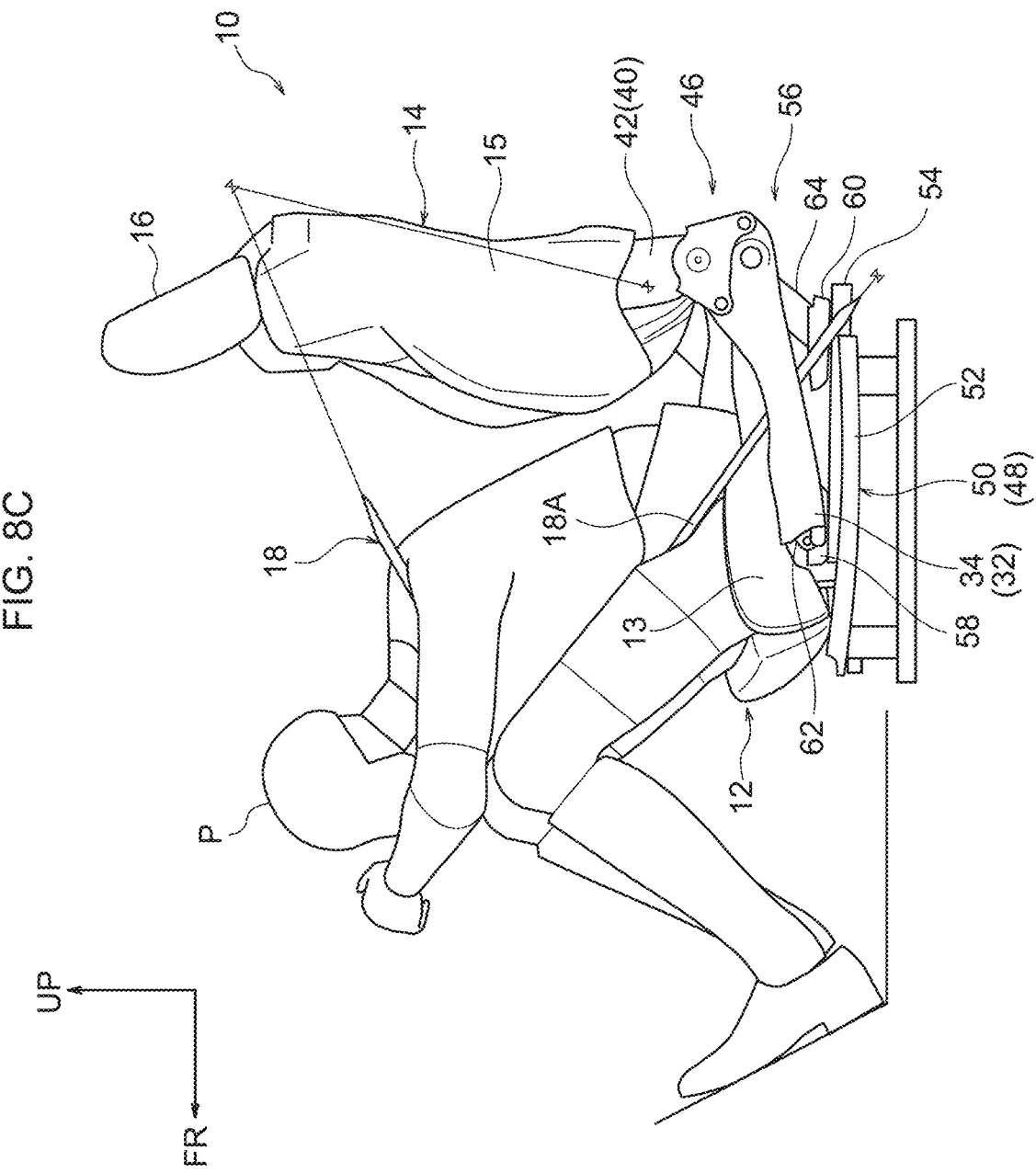
FIG. 8C is a side view corresponding to FIG. 8A and FIG. 8B and illustrating a state at later stage of a head-on collision.

As illustrated in FIG. 8A to FIG. 8C, the vehicle seat 10 according to the present exemplary embodiment includes a seat cushion 12 for an occupant P of a vehicle to sit on, a seatback 14 configuring a backrest to support the back of the occupant P, and a headrest 16 for supporting the head of the occupant P. The front-rear direction, left-right direction (width direction), and up-down direction of the vehicle seat 10 are respectively aligned with the front-rear, left-right, and up-down directions of the vehicle. Note that the occupant P illustrated in FIG. 8A to FIG. 8C is, for example, a fifty percentile America male adult (AM50) HYBRID III dummy for use in head-on collision crash tests. The occupant P wears a three-point seatbelt 18 installed to a non-illustrated vehicle.

Figure 2:
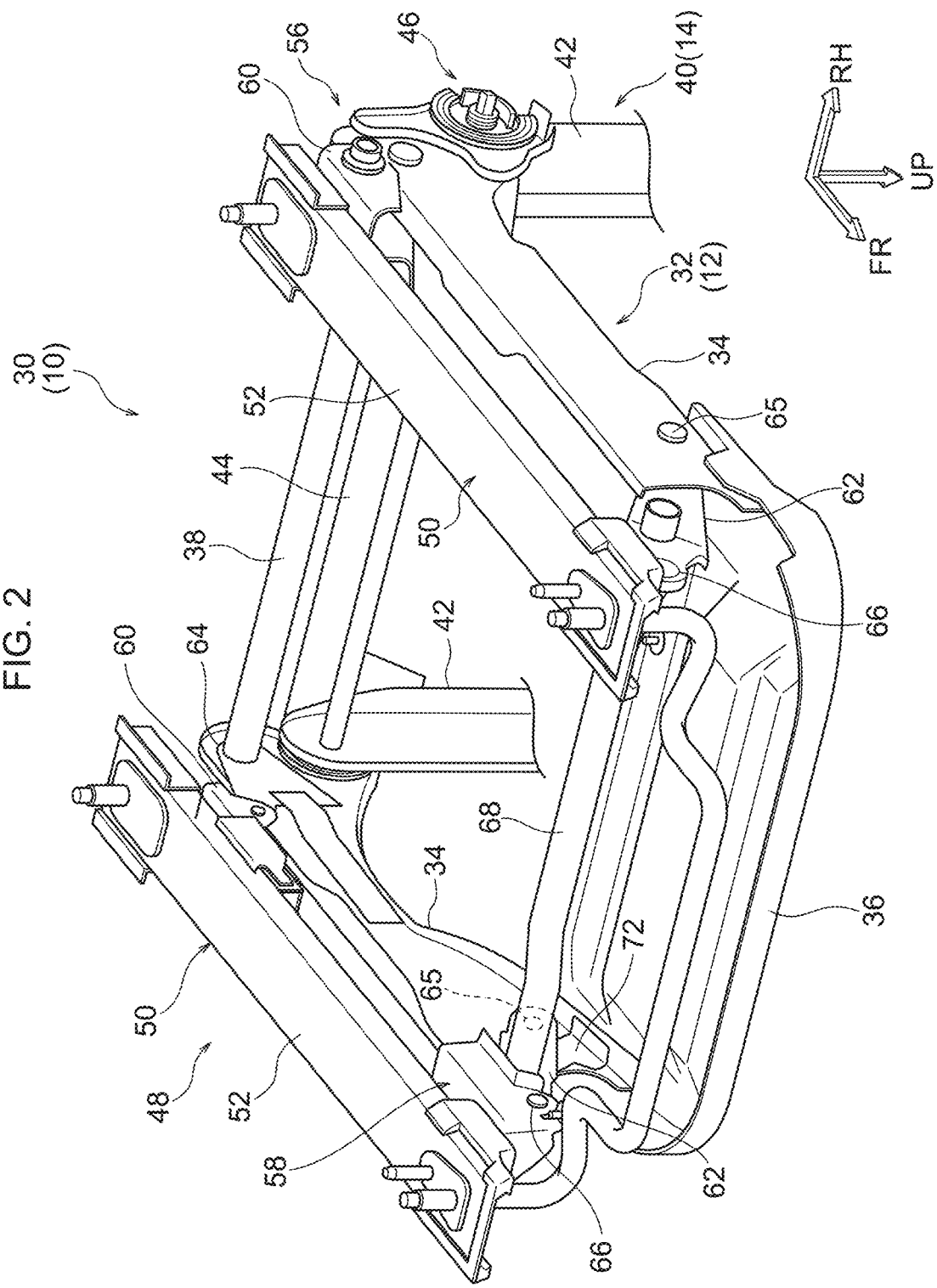
FIG. 2 is a perspective view illustrating a periphery of a seat cushion frame of the same vehicle seat frame, in a state viewed diagonal from a seat right-front side and below.
Figure 3:
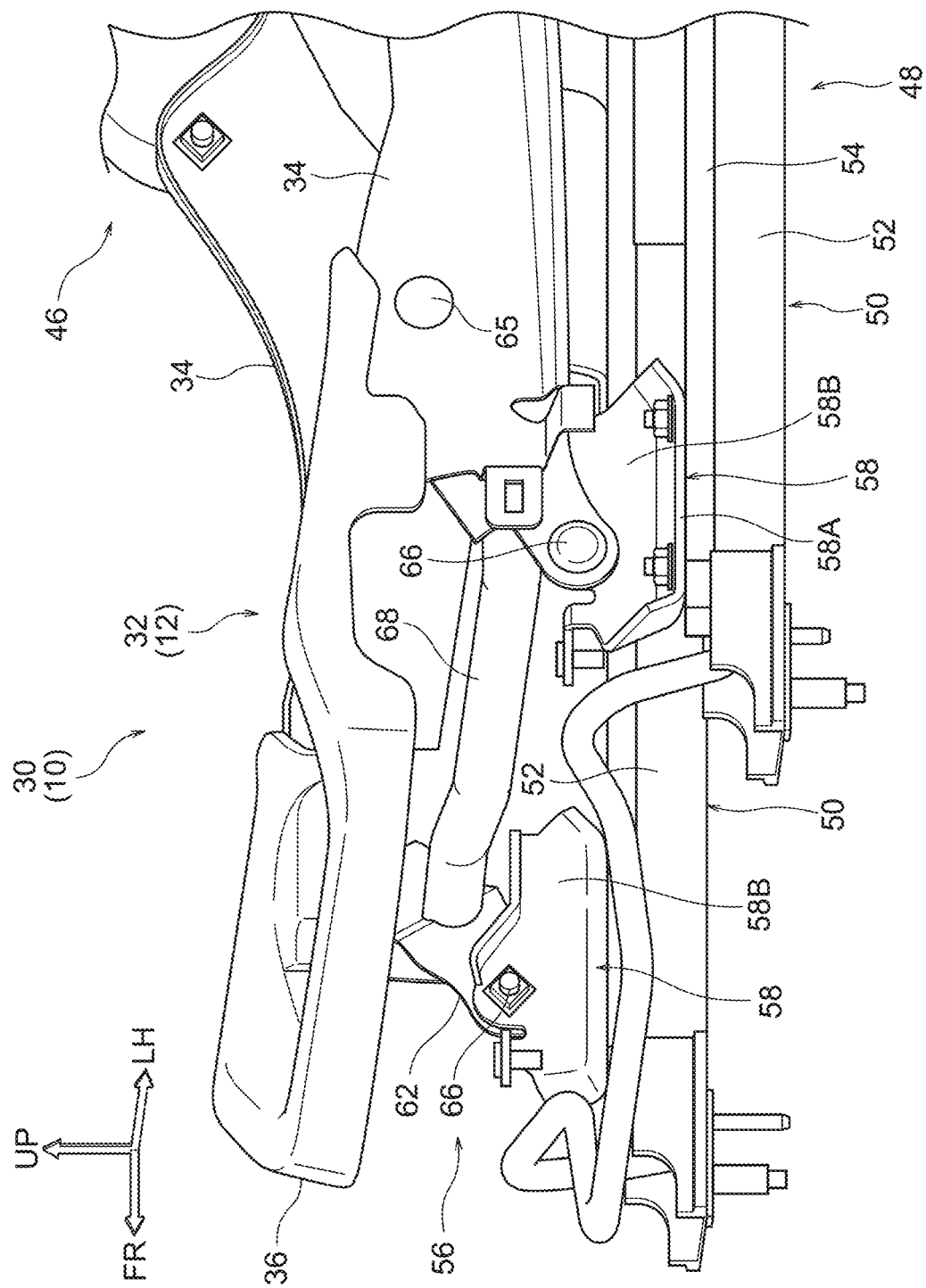
FIG. 3 is a perspective view illustrating a periphery of a front portion of a seat cushion frame of the same vehicle seat frame, in a state viewed diagonal from a seat left-front side.

The framework of the vehicle seat 10 is configured by a vehicle seat frame 30 as illustrated in FIG. 1 to FIG. 3. The vehicle seat frame 30 includes the seat cushion frame 32 configuring framework of the seat cushion 12, and a seatback frame 40 configuring framework of the seatback 14.

Pad members (omitted in the drawings) respectively covered by a cover 13, 15 (see FIG. 8A to FIG. 8C) are attached to the seat cushion frame 32 and the seatback frame 40.

The seat cushion frame 32 includes a left-right pair of side frames 34 disposed at left and right side portions of the seat cushion 12 and extending along the seat front-rear direction, a cushion pan 36 spanning between upper end portions at the front portions of the left and right side frames 34, and a rear frame 38 spanning between rear end portions of the left and right side frames 34. Non-illustrated seat cushion springs are spanned between the cushion pan 36 and the rear frame 38. The pad member of the seat cushion 12 is elastically supported from the seat lower side by these seat cushion springs.

The left and right side frames 34 are, for example, formed in elongated shapes from press formed sheet metal, and are disposed at an orientation such that their length directions are along the seat front-rear direction, and their thickness directions are along the seat left-right direction. The cushion pan 36 is, for example, formed in a substantially rectangular shape from sheet metal, and is disposed at an orientation such that its thickness direction is along the seat up-down direction, and the two seat left-right direction ends of the cushion pan 36 are fixed to the respective front portions of the left and right side frames 34 by a method such as welding. The rear frame 38 is, for example, formed from a metal pipe, and is disposed at an orientation such that its axial direction is along the seat left-right direction, with both seat left-right direction ends of the rear frame 38 connected, so as to allow rotation, to rear end portions of the left and right side frames 34 by a method such as crimping.

A lower end portion of the seatback frame 40 is connected to rear end portions of the left and right side frames 34 through a known reclining mechanism 46 so as to enable reclining. The seatback frame 40 includes a left-right pair of side frames 42 disposed at left and right side portions of the seatback 14 and extending in the seat up-down direction, a non-illustrated upper frame spanning between upper end portions of the left and right side frames 42, and a lower frame 44 spanning between lower end portions of the left and right side frames 42. The headrest 16 is connected to the above upper frame.

The left and right side frames 34 of the seat cushion frame 32 are connected to a vehicle floor section through a known slider mechanism 48 and lifter mechanism 56, and are accordingly adjustable in both front-rear direction position and up-down direction position with respect to the vehicle floor section. The slider mechanism 48 is configured including a left-right pair of slide rails 50 disposed below the left and right side frames 34. The slide rails 50 each include a lower rail 52 fixed to the vehicle floor section by, for example, a method such bolt fastening, an upper rail 54 supported by the lower rail 52 so as to be able to slide in the front-rear direction relative thereto, and a non-illustrated lock mechanism to restrict sliding of the upper rail 54 with respect to the lower rail 52. The lower rail 52 and the upper rail 54 are disposed with their long sides along the front-rear direction.

The lifter mechanism 56 is configured including a left-right pair of front risers 58 (see FIG. 1 to FIG. 3), a left-right pair of rear risers 60 (see FIG. 1 and FIG. 2), a left-right pair of front links 62 (see FIG. 2 to FIG. 3), and a left-right pair of rear links 64 (see FIG. 2; note that the right side rear link 64 is omitted in the drawing). The left and right front risers 58, the left and right rear risers 60, the left and right front links 62, and the left and right rear links 64 are, for example, manufactured from press formed sheet metal. The left and right front risers 58 correspond to "left and right risers" of the present disclosure, and the left and right front links 62 correspond to "left and right links" of the present disclosure.

As illustrated in FIG. 3, the left and right front risers 58 each include a front fixed portion 58A fixed to an upper face of front end portions of the left and right upper rails 54 by a method such as bolt fastening, and a front vertical wall 58B extending upward from left-right direction inside ends of the front fixed portion 58A. Although omitted from the drawings, the left and right rear risers 60 include rear fixed portions fixed to an upper face of rear end portions of the left and right upper rails 54 by a method such as bolt fastening and rear vertical walls extending upward from left-right direction one end portions of the rear fixed portions.

The left and right front links 62 and the left and right rear links 64 are disposed at orientations tilting toward the rear side. Each of one end portions (each upper end portion) of the left and right front links 62 is superimposed on a front portion of the left and right side frames 34 from the left-right direction inside, and is connected to the front portion of the left and right side frames 34 so as to be capable of rotating with respect thereto through a connection shaft 65 having an axial direction along the left-right direction. Each other end portion (each lower end portion) of the left and right front links 62 is superimposed on a front vertical wall 58B of the left and right front risers 58 from the left-right direction outside, and connected to the front vertical wall 58B so as to be capable of rotating with respect thereto through a connection shaft 66 having an axial direction along the left-right direction.

Each one end portion (each upper end portion) of the left and right rear links 64 is disposed at the left-right direction inside with respect to the rear portion of the left and right side frames 34, and is fixed to the rear frame 38. The left and right rear links 64 are accordingly connected to the left and right side frames 34 so as to be capable of rotating with respect thereto through the rear frame 38. Each other end portion (each lower end portion) of the left and right rear links 64 is superimposed on a rear vertical wall of the left and right rear risers 60 from one left-right direction side, and connected to the rear vertical wall so as to be capable of rotating with respect thereto through a connection shaft (omitted in the drawings) having an axial direction along the left-right direction.

A sector gear is, for example, formed to one of the left and right rear links 64, and this rear link 64 is rotated by a non-illustrated pinion meshed with this sector gear being rotated manually or electrically. A configuration is accordingly achieved in which the left and right rear links 64 and the left and right front links 62 are rotated thereby, and the up-down direction position of the seat cushion frame 32 (namely, the seat cushion 12) is changed.

The left and right front links 62 are connected together in the left-right direction by a connection pipe 68 serving as a connection member. The connection pipe 68 is configured from, for example, a metal pipe member, and is disposed with its axial direction along the left-right direction. The two axial direction end portions of the connection pipe 68 are inserted into through holes (omitted in the drawings) formed through intermediate portions of the left and right front links 62, and are fixed to the left and right front links 62 by a method such as welding.

As illustrated in FIG. 1, the seat cushion frame 32 includes a reinforcement member 72 fixed to a rear end portion of the cushion pan 36. The reinforcement member 72 is, for example, manufactured from press formed sheet metal, and includes a left-right pair of reinforcement portions 72A and a connection portion 72B. The left and right reinforcement portions 72A are fixed to the two left-right direction sides of rear end portions of the cushion pan 36, and reinforce the affixed locations. The connection portion 72B connects the left and right reinforcement portions 72A together in the left-right direction.

Figure 4:
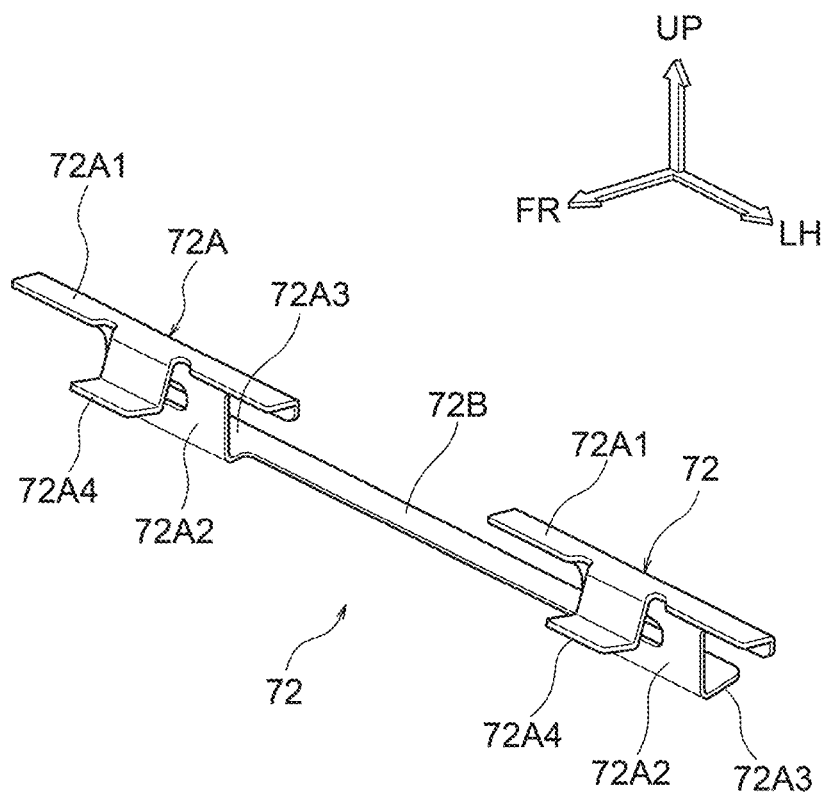
FIG. 4 is a perspective view illustrating a reinforcement member.

As illustrated in FIG. 4, the left and right reinforcement portions 72A each include, as an example, a fixed portion 72A1, a downward extension portion 72A2, a rearward extension portion 72A3, and a fixing tab 72A4. The fixed portions 72A1 are fixed to an upper face of rear end portions of the cushion pan 36 by a method such as welding. The downward extension portions 72A2 extend downward from left-right direction central portions of rear edges of the fixed portions 72A1. The rearward extension portions 72A3 extend rearward from lower ends of the downward extension portions 72A2. The rearward extension portions 72A3 of the left and right reinforcement portions 72A are connected together in the left-right direction by the connection portion 72B, and are formed as one body with the connection portion 72B. The fixing tabs 72A4 extend downward from left-right direction central portions of front edges of the fixed portions 72A1. A lower side of each of the fixing tabs 72A4 is bent forward. The fixing tabs 72A4 are inserted into non-illustrated holes formed in the cushion pan 36, and are fixed to the cushion pan 36 by a method such as welding.

The reinforcement member 72 configured as described above serves as a deformation amount adjustment member for adjusting the amount of deformation of the cushion pan 36 during a head-on collision. The left and right reinforcement portions 72A are disposed at positions so as to oppose the left and right ischial bones of the occupant P (omitted in the drawings) from the front side. Thus during a head-on collision the load from the left and right ischial bones of the occupant P is input to the locations affixed with the left and right reinforcement portions 72A on the cushion pan 36.

The head-on collision referred to above is, for example, a collision similar to a full frontal rigid barrier impact test (at a speed of 35 mph (approximately 56 km/h)) as defined by the US National Highway Traffic Safety Administration (NHTSA). A comparatively low load from the occupant P is imparted to the seat cushion 12 at an initial stage of the head-on collision (see FIG. 8B), and a comparatively high load from the occupant P is imparted to the seat cushion 12 at a later stage of the head-on collision (see FIG. 8C).

Figure 5A:
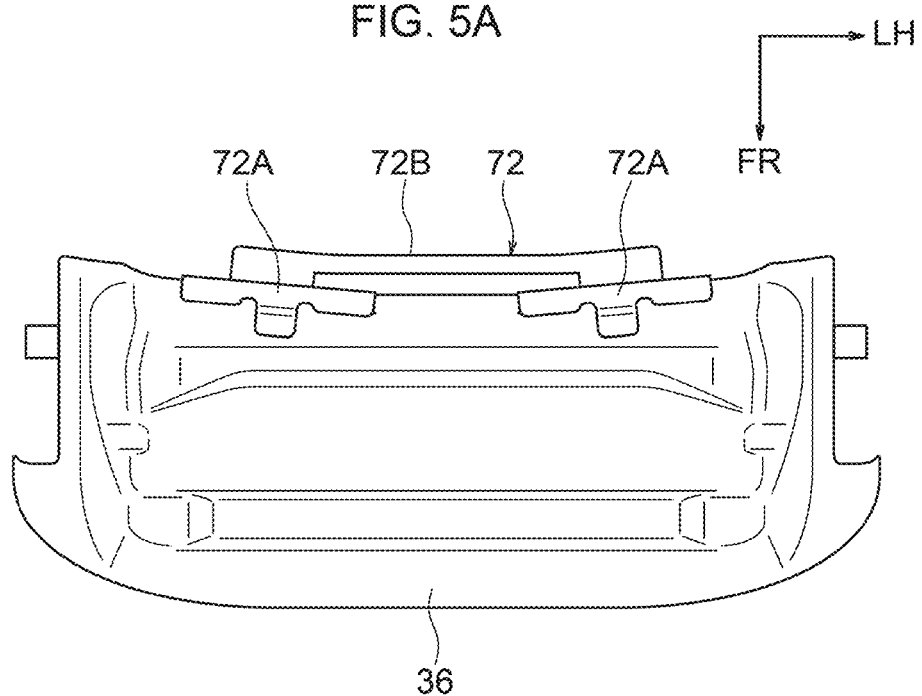
FIG. 5A is a plan view illustrating a cushion pan and a reinforcement member.
Figure 5B:
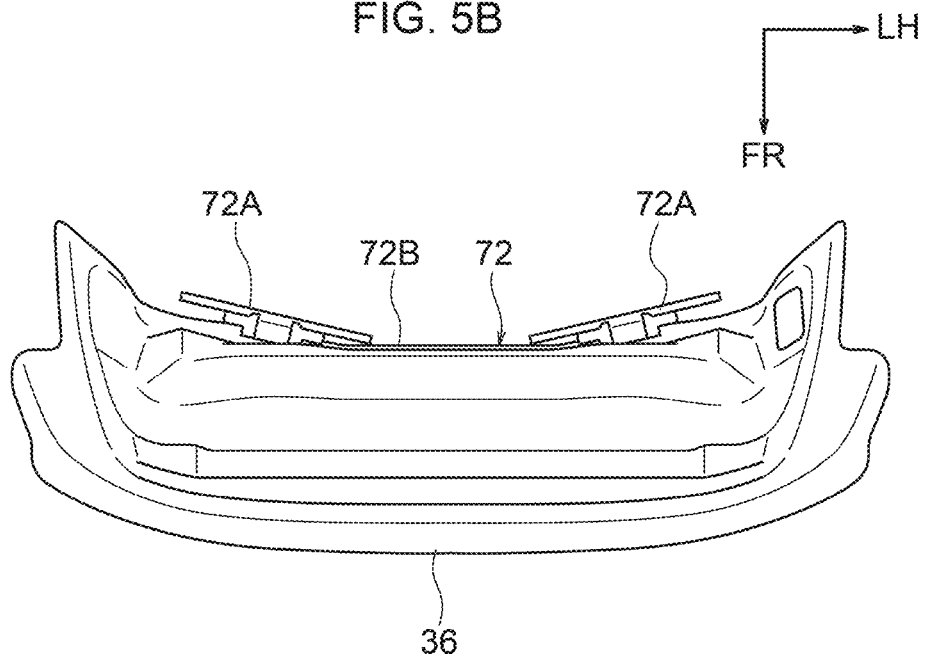
FIG. 5B is a plan view illustrating a cushion pan and a reinforcement member, in a state deformed by load from an occupant during a head-on collision.

In the present exemplary embodiment, as illustrated in FIG. 5A, at an initial stage of a head-on collision deformation (collapsing inward toward the lower side) of the cushion pan 36 is suppressed by the left and right reinforcement portions 72A. Then, at a later stage of the head-on collision, the cushion pan 36 is deformed as illustrated in FIG. 5B by an increase in the load imparted to the cushion pan 36 from the left and right ischial bones of the occupant P.

Figure 6:
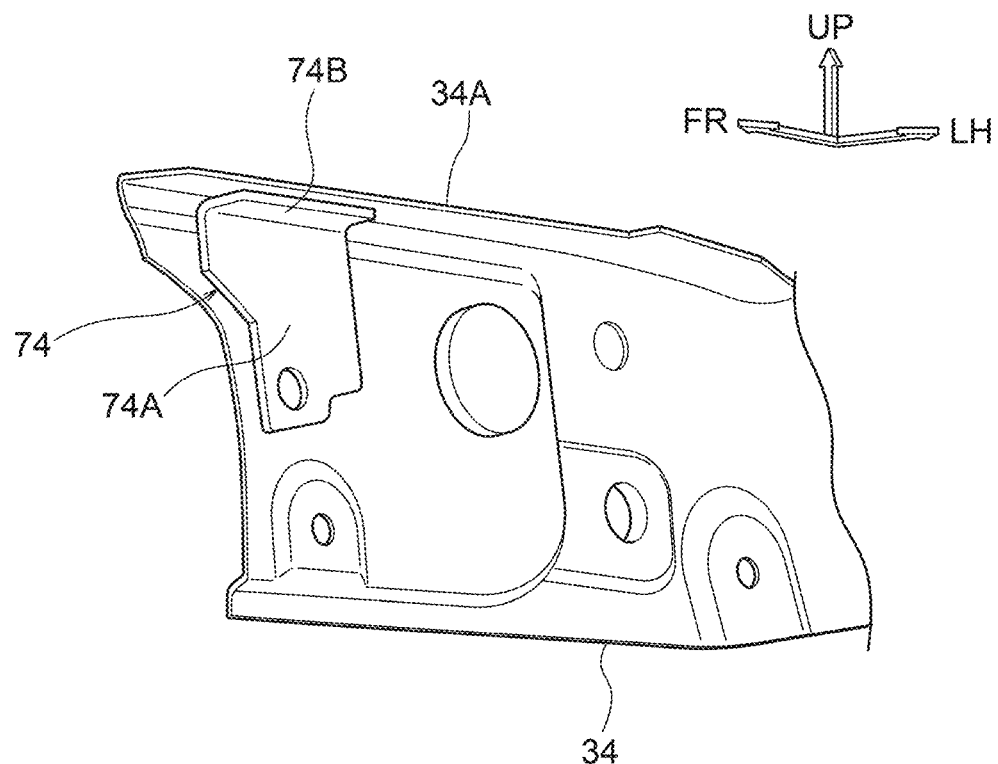
FIG. 6 is a perspective view illustrating a front portion of a side frame.

Moreover, in the present exemplary embodiment, as illustrated in FIG. 6, the seat cushion frame 32 includes left and right reinforcement patches 74 fixed to left-right direction side surfaces (in this example inside surfaces) of the front portions of the left and right side frames 34. The left and right reinforcement patches 74 are disposed further toward the front side than the one end portions (the upper end portions) of the left and right front links 62 connected to the front portions of the left and right side frames 34.

The reinforcement patches 74 are, for example, manufactured from press formed sheet metal. Each of the reinforcement patches 74 includes, as an example, a patch main body 74A superimposed on the left-right direction inside face of the front portion of each of the side frames 34, and an upper flange 74B extending toward the left-right direction inside from an upper edge of the patch main body 74A. An upper flange 34A extending toward the left-right direction inside is formed to an upper edge of each of the side frames 34, and the upper flange 74B of each of the reinforcement patches 74 is superimposed on a bottom face of the upper flange 34A. These reinforcement patches 74 are fixed to front portions of the side frames 34 by a method such as welding, and the front portions of the side frames 34 are reinforced at the locations affixed with the reinforcement patches 74. Note that a configuration may be adopted in which the reinforcement patches 74 are each fixed to a left-right direction outside face of the front portions of the side frames 34. The shape of each of the reinforcement patches 74 may also be modified as appropriate.

Figure 7:
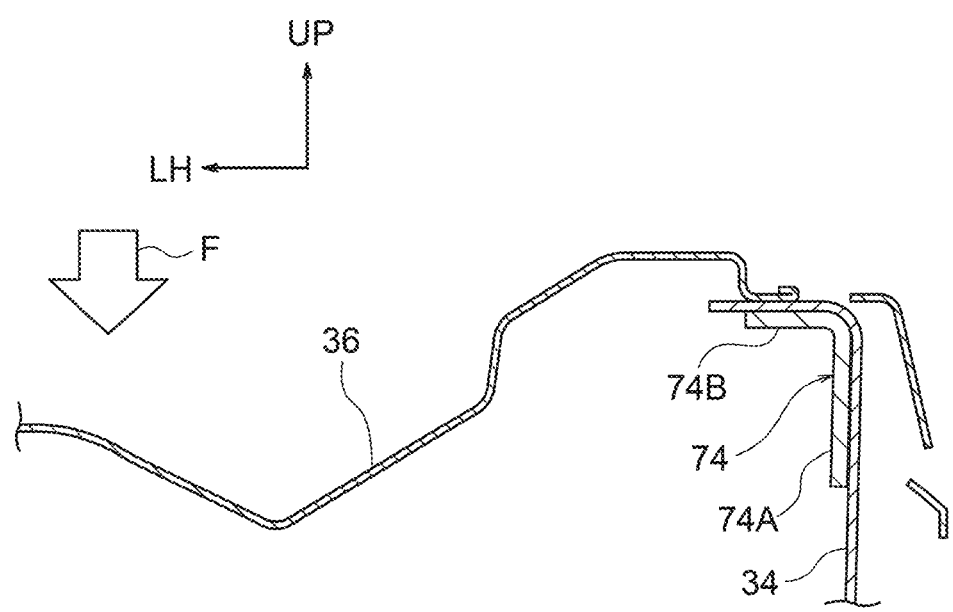
FIG. 7 is a cross-section illustrating a periphery of a reinforcement patch, in a state viewed from a seat rear side.

The left and right reinforcement patches 74 configured as described above serve as reinforcement members to suppress deformation of the front portions of the left and right side frames 34 toward the left-right direction inside (inward collapse) under load F from the occupant imparted to the cushion pan 36 during a head-on collision (see FIG. 7). Such deformation suppression results in a configuration in which a reaction force from the front portion of the seat cushion 12 imparted to the buttocks of the occupant P is increased at an initial stage of the head-on collision.

Operation and Advantageous Effects

Next, description follows regarding operation and advantageous effects of the present exemplary embodiment.

In the vehicle seat 10 configured as described above, the seat cushion frame 32 configuring the framework of the seat cushion 12 includes the left and right side frames 34, the cushion pan 36, and the reinforcement member 72. The left and right side frames 34 are disposed at left and right side portions of the seat cushion 12. The cushion pan 36 connects the upper end portions of the front portions of the left and right side frames 34 together in the left-right direction. The reinforcement member 72 includes the left and right reinforcement portions 72A fixed to the two left-right direction sides of a rear end portion of the cushion pan 36.

The locations of the cushion pan 36 affixed with the left and right reinforcement portions 72A are reinforced, and so the cushion pan 36 is suppressed from deforming under load from the buttocks of the occupant P imparted to the cushion pan 36 at an initial stage of a head-on collision (see FIG. 8B). The reaction force from the cushion pan 36 imparted to the buttocks of the occupant at the initial stage of a head-on collision is accordingly increased. As a result the movement due to inertia of the occupant P toward the vehicle front direction is suppressed, and restraint of the waist of the occupant P by a lap belt 18A of the seatbelt 18 is maintained so as to enable a submarining phenomenon to be suppressed from occurring.

Moreover, at a later stage of a head-on collision (see FIG. 8C), the cushion pan 36 deforms from the seat left-right direction center, which is not reinforced by the left and right reinforcement portions 72A. This accordingly enables a shock absorbing ability to be secured. As a result an injury severity score of the occupant P can be reduced. Moreover, an existing cushion pan can be appropriated as the above cushion pan 36, enabling a simple configuration to be achieved.

Moreover, in the present exemplary embodiment the left and right reinforcement portions 72A described above are disposed at positions opposing the left and right ischial bones of the occupant P seated on the seat cushion 12 from the front side. This means that the left and right ischial bones of the occupant P bear reaction force from the locations affixed with the left and right reinforcement portions 72A on the cushion pan 36 at an initial stage of a head-on collision. This enables forward movement of the occupant P due to the shock of a head-on collision to be suppressed effectively.

Moreover, in the present exemplary embodiment the left and right reinforcement portions 72A of the reinforcement member 72 are connected in the seat left-right direction by the connection portion 72B, enabling the reinforcement member 72 to be configured as a single component. This accordingly facilitates a reduction in manufacturing cost compared to cases in which the reinforcement member 72 is two components. Moreover, due to reaction force from the connection portion 72B also being imparted to the buttocks of the occupant P at an initial stage of the head-on collision, the submarining phenomenon occurrence suppressing effect can be raised even more.

Furthermore, in the present exemplary embodiment the left and right reinforcement patches 74 are fixed to the seat left-right direction side surfaces of the front portions of the left and right side frames 34 of the seat cushion frame 32 further toward the seat front side than the one end portions of the left and right front links 62, and the locations affixed with the reinforcement patches 74 are reinforced. This means that, at an initial stage of the head-on collision, the left and right side frames 34 are suppressed from deforming so as to collapse inward toward the seat left-right direction insides when load from the occupant P is imparted to the front portions of the left and right side frames 34 through the cushion pan 36. The reaction force imparted to the occupant P at the initial stage of the head-on collision is increased as a result, enabling the submarining phenomenon occurrence suppressing effect to be raised even more.

Note that although in the above exemplary embodiment the reinforcement member 72 fixed to the rear end portion of the cushion pan 36 is configured including the connection portion 72B connecting the left and right reinforcement portions 72A together, there is no limitation thereto, and the reinforcement member 72 may be configured without including the connection portion 72B.

Moreover, although in the above exemplary embodiment the seat cushion frame 32 is configured including the reinforcement member 72 and the left and right reinforcement patches 74, there is no limitation thereto, and a configuration may be adopted in which the seat cushion frame 32 lacks one out of the reinforcement member 72 or the reinforcement patches 74, or lacks both thereof.

Moreover, although in the above exemplary embodiment the connection pipe 68 serving as the connection member is configured manufacture from a metal pipe, there is no limitation thereto, and the material of the connection member may be modified as appropriate.

Various other modifications may also be implemented in the present disclosure within a range not departing from the spirit of the present disclosure. Obviously the scope of rights of the present disclosure is not limited by the above exemplary embodiments.

What is claimed is:

1. A seat cushion frame configuring a framework of a seat cushion for an occupant of a vehicle to sit on, the seat cushion frame comprising:
    left and right side frames disposed at left and right side portions of the seat cushion;
    a cushion pan connecting upper end portions of front portions of the left and right side frames together in a seat left-right direction; and
    a reinforcement member that includes left and right reinforcements portions respectively affixed to seat left-right direction sides of a rear end portion of the cushion pan so as to reinforce the sides to which the reinforcement portions are affixed,
    wherein the reinforcement member does not reinforce a center portion of the seat left-right direction of the rear end portion of the cushion pan.

2. The seat cushion frame of claim 1, wherein the left and right reinforcement portions are disposed at positions opposing left and right ischial bones of the occupant from a seat front side.

3. The seat cushion frame of claim 1, wherein the reinforcement member includes a connection portion that connects the left and right reinforcement portions together in the seat left-right direction.

4. The seat cushion frame of claim 1, wherein:
    the left and right side frames are connected to a floor section of the vehicle via left and right links having respective one end portions connected to the front portions of the left and right side frames, via left and right risers to which respective other end portions of the left and right links are connected, and via left and right slide rails to which the left and right risers are attached; and
    left and right reinforcement patches are affixed to seat left-right direction side surfaces of the front portions of the left and right side frames, further toward a seat front side than the one end portions of the left and right links, such that the front portions of the left and right side frames are reinforced by the left and right reinforcement patches.

5. A vehicle seat frame comprising:
    the seat cushion frame of claim 1;
    left and right links each having a one end portion connected to respective front portions of the left and right side frames included in the seat cushion frame;
    left and right slide rails that are disposed below the left and right side frames and that are attached to a floor section of the vehicle; and
    left and right risers that are respectively attached to the left and right slide rails and to which respective other end portions of the left and right links are connected.

6. A vehicle seat comprising:
    a seat cushion for an occupant to sit on;
    a seatback configuring a backrest to support a back of the occupant; and
    a framework of the seat cushion comprising the seat cushion frame of claim 1.

* * * * *